Oct. 16, 1962 R. W. EVANS ET AL 3,058,576
METHOD AND APPARATUS FOR MOVING PULVERULENT MATERIALS
Filed Nov. 17, 1959
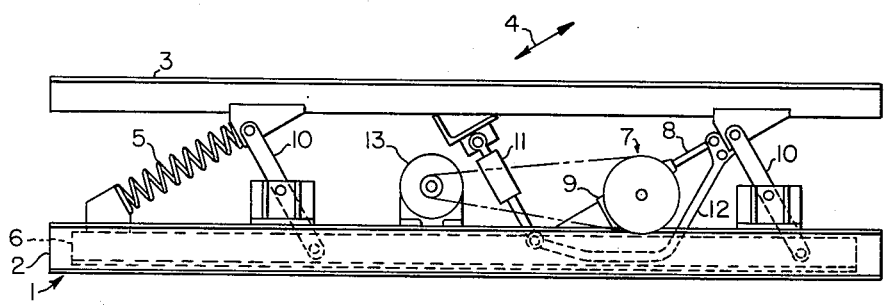
Fig. I
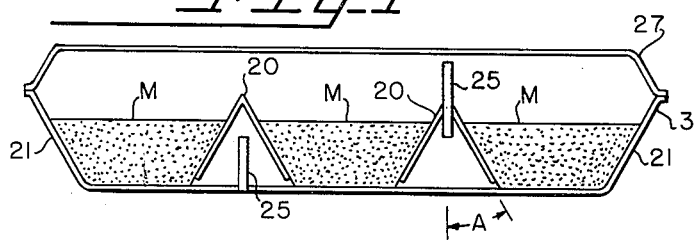
Fig. II
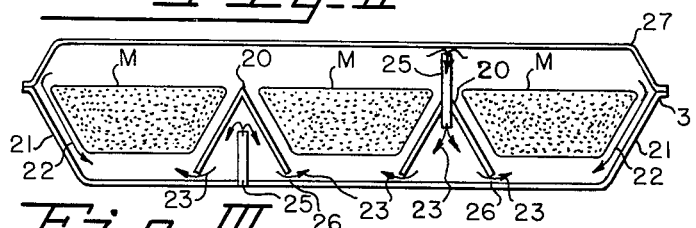
Fig. III
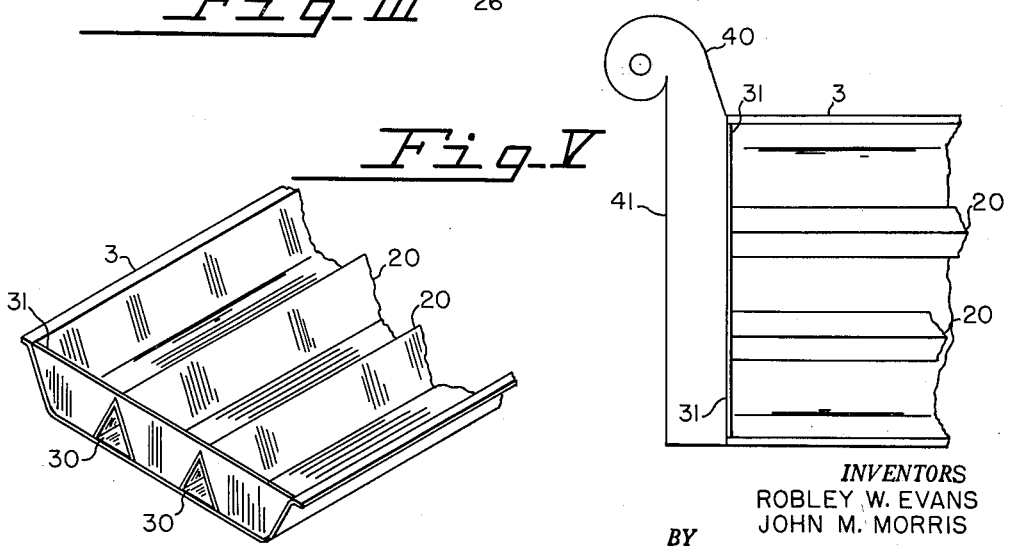
Fig. V
Fig. IV
INVENTORS
ROBLEY W. EVANS
JOHN M. MORRIS
BY
Marshall, Marshall & Yeasting
ATTORNEYS United States Patent Office 3,058,576
Patented Oct. 16, 1962

3,058,576
METHOD AND APPARATUS FOR MOVING
PULVERULENT MATERIALS
Robley W. Evans, New Albany, Ind., and John M. Morris, Louisville, Ky., assignors, by mesne assignments, to Chain Belt Company, Milwaukee, Wis., a corporation of Wisconsin
Filed Nov. 17, 1959, Ser. No. 853,532
12 Claims. (Cl. 198—220)

This invention relates to a method and apparatus for the movement of a pulverulent material from one point to another, particularly to utilizing vibrating conveyors of the directional throw type to perform the above method. Vibrating conveyors of the type referred to above convey material by vibration of the conveyor trough or deck obliquely relative to its material supporting surface whereby the material is tossed forwardly and upwardly and thereby conveyed lengthwise of the supporting surface or deck or trough.

Before explaining the distinctive features of the present invention it should be pointed out that in the ordinary vibrating conveyor when the mat of comparatively dry granular material is conveyed by progressive throwing forward and upward relative to the conveyor pan, the mat is separated from the supporting surface of the trough and the void space thereby created reacts as a partial vacuum with respect to the ambient pressure above the mat. Thus, the mat has a force acting upon it tending to keep the mat from separating from the deck or conveyor pan a sufficient distance for efficient conveying.

Under certain conditions and with certain materials according to some theorists the void space under the mat becomes filled with air. In a conventional vibrating trough having upstanding parallel sides, if the mat of conveyed material consists of fine particles of low specific gravity, according to the above theorists, the inrushing air will be trapped between the particles and they will be partially held in suspension. This condition is known as a condition of "aeration." The effect of such aeration is three-fold, viz. the bulk density of the material is reduced and for a given depth of mat and conveying speed the capacity of the conveyor in pounds per hour is proportionately reduced; as a result of inter-particle slippage the mean speed of conveying of the mat is substantially reduced, resulting in a further decreases of conveying capacity; and the maximum depth of the mat which the conveyor can transport will be limited by the degree of aeration, this resulting from extreme slippage between the particles and caused by the inability of the lower particles to impart a directional conveying impulse to the upper particles. Thus it is apparent the whatever the theory of difficulty that with the conventional conveying troughs having flat bottom pans and upstanding parallel sides, the conveying capacity of the conveyor is greatly reduced by the use of fluffy materials such as baking flour and the like.

It is accordingly an object of this invention to provide an improved method and apparatus for moving finely divided pulverulent material.

It is another object of this invention to provide a unique form of conveyor trough or deck to perform the method of this invention.

Still another object of this invention is to provide a highly improved method for conveying fluffy materials which is operative to deaerate and compact the fluffy materials while greatly increasing the conveying speed and capacity of a conveyor.

In accordance with the above objects a feature of this invention is the method of conveying pulverulent material by the steps of forming a deck having a plurality of lengthwise extending depressions to receive the materials, vibrating the deck at a frequency along a path such that the materials are tossed upwardly and forwardly with respect to the depressions, compacting the materials as they fall back into said depressions after said tossing by impact with the sides of said depressions, and admitting gas at a predetermined pressure to the lowermost portions of said depressions from a source other than the natural flow of ambient gas down the side of said depressions. More specifically, the above method may include as one of its step forming a corrugated deck having a plurality of lengthwise troughs such that said troughs have a width across the bottom that is less than the width across the top. Even more specifically the above method may include a step of fixedly disposing a plurality of inverted V-shaped partitions lengthwise relative to a conveyor deck so that a slit is formed between each of the lower edges of each of the inverted V-shaped partitions and the deck, and admitting gas at a predetermined pressure through the spaces formed by said partitions and said deck. The inverted V-shaped partitions may be disposed relative to each other so that troughs are formed between the partitions having a width across the bottom less than one-half the width across the top. Depending upon the desired effects on the pulverulent material the pressure at which said gas is admitted to the various geometries described above may vary up to at least equal to the ambient atmospheric pressure, and above to a pressure greater than atmospheric pressure providing that the admission of the gas as described above to the various geometries is not sufficient to fluidize the material.

Also, in accordance with the above objects the apparatus for carrying out the method of this invention may comprise a corrugated conveyor deck having a plurality of lengthwise troughs wherein each of the troughs is wider at the top than it is at the bottom, means for vibrating the deck at a frequency and along a path such that material will be tossed upwardly and forwardly with respect to the troughs, and means for admitting gas at a predetermined pressure to the lowermost portions of the troughs from a source other than the natural flow of the ambient gas down the sides of the troughs in response to the upward and forward movement of the materials. The above conveyor deck may be formed from a plurality of inverted V-shaped partitions as discussed above. The means for admitting gas to spaces below the inverted V-shaped partitions may comprise a plurality of standpipes disposed under the plurality of inverted V-shaped partitions. The standpipes may be connected directly to the ambient atmosphere, to a source of gas under pressure, or to the space above the material on an enclosed conveyor deck.

Other objects, features and advantages of the invention disclosed herein may be clearly seen in the following description of the accompanying drawings in which:

FIG. I is a side elevational view of a vibrating conveyor;

FIG. II is an end elevation view, on an enlarged scale, showing a novel form of the conveying trough of FIG. I;

FIG. III is a view similar to FIG. II except showing the conveyed material thrown upwardly with respect to the material supporting surface of the conveyor trough or deck;

FIG. IV is a perspective view of a second embodiment of the conveyor trough utilized in this invention; and FIG. V is a plan view of a third embodiment of the teachings of this invention.

In FIG. I of the drawing there is illustrated a vibrating conveyor 1 which comprises a frame or base 2 and a conveyor trough 3 supported thereby for vibration along an oblique path as denoted by the line 4.

The trough 3 is resiliently mounted on springs 5 connected between said trough and a counterbalance assembly 6 and vibration of said trough and said counterbalance assembly in direct phase opposition is effected as by means of an eccentric drive unit 7 which, operating through the linkage mechanism which includes a connecting rod 8 and a journal block 9 connected to said trough and assembly respectively and links 10 pivotally connected to said trough and assembly at their ends and to said frame 2 intermediate their ends, causes opposite and equal vibrations of said counterbalance assembly 6 and said trough 3. These conveyors 1 are designed for operation at the natural frequencies of the system of masses and springs and at a predetermined uniform amplitude, and for such purpose an extensible link in the form of a hydraulic shock absorber unit 11 and a link or bell crank 12 are employed to provide a substantially positive drive of predetermined stroke at the natural frequency of say 500 cycles per minute, for example, and to allow a gradual settling of the trough 3 under varying loads of conveyed material thereon.

The link 12 is pivotally connected at one end to said trough 3 and at the other end to one end of said unit 11, the connecting rod 8 being pivotally connected to said link 12. Thus as the load on the conveyor varies, the link 12 will cause lengthening or shortening of the unit 11 without transmitting added load on rod 8 or drive unit 7, and at any settled position of the conveyor the amplitude of vibration will remain constant, since at 500 cycles per minute, for example, the unit 11 is for all practical purposes of fixed length.

It is to be understood that for the purposes of the present invention, the vibration of the trough 3 may be induced by means other than herein disclosed and that the particular mechanism herein is to be regarded merely as typical.

As best shown in FIGS. II and III, the trough 3 is provided with de-aerating vanes 20, which, together and with the sloping sides 21 of the trough, serve to divide the mat of conveyed material M into separate sections or troughs or corrugations of wedge or trapezoidal cross-section shape of such proportions as shown that the width of the bottom of each section is comparatively narrow with respect to width of the top of each section, for example nearly 1:2 or less. According to the aeration theory the maximum width of the bottom of each section for any particular material to be conveyed will be in inverse ratio to its tendency to aerate, or, in other words, the finer the particle size and the lighter its specific gravity and also the closer the individual particles tend to be spherical, the smaller the width of the bottom must be relative to the width of the top. The slope (angle A) of the sides of the de-aerating vanes 20 and of the sides 21 of the trough is not extremely critical and may be varied without substantial change in results between 30° and 70°.

The practical result with the vanes is that when the wedge-shaped mats of material are thrown upwardly and forwardly from the bottom surface of the conveyor trough 3, the air or other gas around the conveyor 1 and in contact with the top surface of the mat, flows around the wedge-shaped sections M as represented by arrows 22 rather than attempting to flow through the mat sections, as would be the case where the conveyor trough has parallel upstanding side portions and a wide, flat bottom surface. This flowing of the air or other gas around the mat sections M greatly lessens the tendency for the mat sections to become aerated, thereby resulting in a greater conveyed depth, higher mean conveying speeds, and greater bulk densities. The flow of the air around the mat sections M as noted helps remove the effect of the partial vacuum under the mats formed as discussed hereinbefore. These combined factors result in higher conveying capacity in pounds per hour.

The degenerating vanes 20 have an additional function which contributes to de-aerating of the mats M of conveyed material, and that is because of the wedge shape as shown and the oscillating or vibrating path 4 of rising and falling of the mats during each stroke of the conveyor vibration, the downwardly converging sides of the vanes 20 and of the sides 21 of the trough 3 tend to compact or squeeze the mats laterally into a smaller space thereby expelling the air or other gases therein by compression. When a very fluffy material such as baking flour, for example, is conveyed in a conveyor having the present vanes 20 and sloping trough sides 21, it will be found, upon stopping the conveyor, that such product for the first foot or so of the conveyor trough length will be so aerated that when a person closes his eyes and moves his hand toward the product, it will be extremely difficult to determine at what point the product was in contact with the hand and, in fact, most persons will first get the sensation of feeling something when they touch the bottom of the trough. However, beyond that point of the conveyor trough the product will be found to have been so de-aerated due to the action aforesaid and to the squeezing out of the air therefrom that the surface of the mats M are considerably more solid and can be readily felt as distinct layers on the trough 3. The flow of the air or other surrounding gas around the sides of the mats M and the continued squeezing action keeps the product from becoming re-aerated further along the conveyor trough.

In addition to the flow of the ambient gas as indicated by the arrows 22 around the wedge-shaped sections M rather than through the mat sections as indicated when the conveyor trough had parallel upstanding sides there is shown in FIG. III air which is represented by the arrows designated at 23 which is flowing out of the standpipes 25 and under the inverted V-shaped vanes 20 laterally through the slits or slots 26 formed between the deck and the edges of the inverted V to the space under the material M being conveyed. It can thus be seen that air is furnished substantially quicker by the addition of the lateral air flow at the bottom of the troughs from under the vanes 20 because the wedge-shaped sections M have no partial vacuum to pull against them when they are being tossed upwardly and forwardly. Further, when the wedge-shaped sections M are falling back into the troughs the possibility of aerating the pulverulent material on the lower portions of the wedge-shaped sections M is lessened because with the embodiment shown in FIG. III the air has an escape route back under the vanes 20 through the slits 26 and out through the standpipes 25. Standpipes are used, of course, instead of simple perforations in the deck so that any material which accidentally tends to slide under the slits 26 is not then allowed to sift through a perforation formed beneath the vane 20 before the next conveying cycle. In more expensive and elaborate arrangements any of the various forms of air check valves that are commercially available could be utilized in place of the standpipes 25 to prevent any sifting back or through of the material M.

FIGS. II and III show two different ways of utilizing the standpipes 25 for admitting air to the spaces under the vanes 20, either of which may be used with equal effectiveness. The standpipes 25 at the left of FIGS. II and III are described above. The standpipes 25 at the right of FIGS. II and III allow communication of the atmosphere above the level of the material being conveyed with the spaces under the vanes 20 by a snorkel-type connection. That is, the standpipes 25 at the right extend through the tops of the vanes 20 upwardly to a height above the material M so that none of the material M is drawn into the standpipes either by the suction caused by the natural breathing through the standpipes as the material rises and falls or by the material being tossed into the standpipes by the conveying action.

Snorkel-type standpipes might be advantageously applied in cooperation with a sealed type conveying system represented by the cover 27 above and attached to the conveying trough 3. For example, it is sometimes desirable when conveying or treating some chemicals to have them come in contact only with an inert atmosphere. Thus, by charging the space enclosed by the conveyor trough 3 and the sealed cover 27 with an inert gas and by utilizing the standpipes as shown on the right of FIGS. II and III the chemical or material M could be conveyed in the manner taught by this invention without exposing it to the ordinary atmosphere. Of course, such apparatus and method could also be applied whenever it was desired to confine all of the chemical to the conveying trough to prevent and suspension of very fine particles in air which might be explosive, poisonous, or otherwise dangerous to the surroundings.

As hereinbefore discussed, it is desirable under some circumstances to supply the air to the spaces under the vanes 20 under a pressure greater than the ambient atmospheric pressure. This would insure that any adhehesion between the wedge-shaped sections M and the vanes 20 and the conveyor deck would be broken very easily and the material tossed upwardly and forwardly with greater ease than before when pulsations of air through the standpipes 25 were depended upon to supply air to the lowermost portions of the trough or depressions in which the wedge-shaped sections M are resting. Since there are a number of ways of applying air under pressure to a position underneath the vanes available to those skilled in the art, this method is represented only schematically hereinafter.

FIG. IV represents one method of supplying air to the spaces below the vanes 20. That is, the vanes 20 are simply connected through their open ends 30 at the end of the conveyor deck or trough 3 to the ambient atmosphere. An end plate 31 may be attached to the conveyor trough 3 if so desired provided the end plate 31 has apertures formed therein which match with the apertures 30 of the open ends of the V-shaped partitions 20. If it is desired to place the air under the vanes at a positive pressure a blower 40 or other air pressure applying means may be attached as is shown in FIG. V to the end plate 31 through a duct 41.

While the cross sectional area of the trough 3 equipped with vanes 20, disposed so that slits are formed between the vanes 20 and the conveyor deck or trough 3, is somewhat less than that of a trough not so equipped, it has been found in spite of this that the conveying capacity of the trough is of much greater capacity than ordinary troughs. In actual tests with troughs of the same width operating at the same frequency and amplitude it has been found that with a solid deck and without vanes a powdered chemical material may be conveyed up a 5° incline at only 12 feet per minute in a bed depth restricted to one-half inch. When vanes were added without slits between the lower edges of the V-shaped vanes and deck the conveyor would convey the powdered chemical up the 5° incline at 12 feet per minute in a mat or bed depth of three inches. When the vanes were supported above the bottom of the deck to provide a small air slot or slit through which air can enter underneath the mat of material, movement increased to 50 feet per minute with a three inch bed providing a 450 percent increase in capacity above the trough equipped with vanes only. In the test above there was no air under pressure under the vanes. The pulsing action of the conveyor was sufficient to cause the air to flow from one end of the vanes to the other and through the slits or slots when the vanes were 15 feet long. Additional improvement in conveying capacity results with different materials with the use of the series of standpipes under each vane as described hereinbefore and by admitting gas or air from a blower to place a positive pressure beneath the vanes.

In conclusion it is pointed out that while the illustrated example constitutes a practical embodiment of my invention, I do not limit myself to the exact details shown, since modification of the same may be varied without departing from the spirit of this invention.

Having described the invention, we claim:

1. The method of conveying a bed of pulverulent material along a deck which comprises the steps of: carrying the material on a deck including a plurality of inverted V-shaped partitions extending lengthwise and spaced relative to said deck so that a slit is formed between at least one of the lower edges of each said inverted V-shaped partition and the deck; admitting a gas at a predetermined pressure to the spaces formed by said partitions and said deck; and vibrating said deck at a frequency and along a path such that as said materials are tossed upwardly and forwardly with respect to said deck gas flows from said spaces into the space beneath said bed of material.

2. The method of conveying a bed of pulverulent material along a deck which comprises the steps of: carrying the material on a deck including a plurality of closely spaced inverted V-shaped partitions extending lengthwise relative to and spaced from said deck so that a slit is formed between at least one of the lower edges of each said inverted V-shaped partition and the deck; admitting a gas at a predetermined pressure to the spaces formed by said partitions and said deck; and vibrating said deck at a frequency and along a path such that as said materials are tossed upwardly and forwardly with respect to said deck gas is drawn through said slits from said spaces.

3. Apparatus for conveying pulverulent material comprising an impervious corrugated conveyor deck having a plurality of lengthwise extending hollow partitions forming troughs therebetween; each of said troughs having a width across the top that exceeds the width across the bottom; and means for vibrating said deck at a frequency and along a path such that materials are tossed upwardly and forwardly with respect to said trough; the interior of each of said partitions being open to the adjacent trough at the bottom thereof whereby gas flows laterally into the lowermost portions of said troughs in response to said upward and forward movement of said materials.

4. Apparatus for conveying pulverulent material comprising a conveyor deck; a plurality of inverted V-shaped partitions fixedly disposed lengthwise relative to said deck so that a slit is formed between each of the lower edges of at least one inverted V and the deck; means for vibrating said deck at a frequency and along a path such that said material is tossed upward and forwardly with respect to said deck; and means for passing a gas at a predetermined pressure laterally through the space formed between said partitions and said deck.

5. Apparatus for conveying pulverulent material comprising a conveyor deck; a plurality of inverted V-shaped partitions fixedly disposed lengthwise relative to said deck so that a slit is formed between at least one of the lower edges of each inverted V and the deck; said V-shaped partitions being disposed relative to each other so that a trough is formed between the partitions of a width across the bottom less than one-half the width across the top; means for vibrating said deck at a frequency and along a path such that said material is tossed upward and forwardly with respect to said deck; and means for admitting a gas at a predetermined pressure through the space formed between said partitions and said deck and said slits into the space beneath the tossed material.

6. Apparatus for conveying pulverulent material comprising a conveyor deck; a plurality of inverted V-shaped partitions fixedly disposed lengthwise relative to said deck so that a slit is formed between at least one of the lower edges of each inverted V and the deck; means for vibrating said deck at a frequency and along a path such that said material is tossed upward and forwardly with respect to said deck; and means for admitting a gas at a predetermined pressure greater than atmospheric pressure to the space formed between said partitions and said deck for lateral flow through said slits.

7. Apparatus for conveying pulverulent material comprising a conveyor deck; a plurality of inverted V-shaped partitions fixedly disposed lengthwise relative to said deck so that a slit is formed between at least one of the lower edges of each inverted V and the deck; means for vibrating said deck at a frequency and along a path such that said material is tossed upward and forwardly with respect to said deck; and means for admitting a gas at a pressure at least equal to the ambient atmospheric pressure to the space formed between said partitions and said deck for lateral flow through said slits.

8. Apparatus for conveying pulverulent material comprising a conveyor deck; a plurality of V-shaped partitions fixedly disposed lengthwise relative to said deck so that a slit is formed between at least one of the lower edges of each inverted V and the deck; means for vibrating said deck at a frequency and along a path such that said material is tossed upwardly and forwardly with respect to said deck; and means for admitting a gas at a predetermined pressure to the space formed under said partitions for lateral flow through said slits.

9. Apparatus for conveying pulverulent material comprising a conveyor deck; a plurality of V-shaped partitions fixedly disposed lengthwise relative to said deck so that a slit is formed between at least one of the lower edges of each inverted V and the deck; means for vibrating said deck at a frequency and along a path such that said material is tossed upwardly and forwardly with respect to said deck; and means for admitting a gas at a predetermined pressure to the space formed under said partitions comprising a plurality of standpipes under each partition communicating with the ambient atmosphere.

10. Apparatus for conveying pulverulent material comprising a conveyor deck; a plurality of V-shaped partitions fixedly disposed lengthwise relative to said deck so that a slit is formed between at least one of the lower edges of each inverted V and the deck; means for vibrating said deck at a frequency and along a path such that material is tossed upwardly and forwardly with respect to said deck; and means for admitting a gas at a predetermined pressure to the space formed under said partitions comprising a plurality of snorkel type standpipes extending upwardly through said partitions.

11. Apparatus for conveying pulverulent material comprising a conveyor deck; a plurality of V-shaped partitions fixedly disposed lengthwise relative to said deck so that a slit is formed between at least one of the lower edges of each inverted V and the deck; cover means for said deck attached thereto whereby the ambient atmosphere is excluded from the materials being conveyed on said deck; means for vibrating said deck at a frequency and along a path such that said material is tossed upwardly and forwardly with respect to said deck; and means for admitting a gas at a predetermined pressure to the space formed under said partitions.

12. Apparatus for conveying pulverulent material comprising a conveyor deck; a plurality of V-shaped partitions fixedly disposed lengthwise relative to said deck so that a slit is formed between at least one of the lower edges of each inverted V and the deck; cover means for said deck attached thereto whereby the ambient atmosphere is excluded from the materials being conveyed on said deck; means for vibrating said deck at a frequency and along a path such that said material is tossed upwardly and forwardly with respect to said deck; and means for admitting a gas at a predetermined pressure to the space formed under said partitions comprising a plurality of snorkel type standpipes extending upwardly through said partitions and communicating only with the gas enclosed by said deck and said cover means.

References Cited in the file of this patent

UNITED STATES PATENTS

| 2,767,826 | Carrier et al. | Oct. 23, 1956 |
| 2,795,318 | Morris | June 11, 1957 |

FOREIGN PATENTS

| 512,036 | Great Britain | Aug. 28, 1939 |

UNITED STATES PATENT OFFICE
CERTIFICATE OF CORRECTION

Patent No. 3,058,576                                  October 16, 1962

Robley W. Evans et al.

It is hereby certified that error appears in the above numbered patent requiring correction and that the said Letters Patent should read as corrected below.

Column 1, line 53, for "the" read -- that --; column 2, line 8, for "side" read -- sides --; column 3, line 73, for "degenerating" read -- de-aerating --; column 5, line 13, for "and" read -- any --; column 6, line 37, for "trough" read -- troughs --.

Signed and sealed this 15th day of December 1964.

(SEAL)
Attest:

ERNEST W. SWIDER
Attesting Officer

EDWARD J. BRENNER
                                                          Commissioner of Patents